(12) United States Patent
Agapiou et al.

(10) Patent No.: US 6,180,808 B1
(45) Date of Patent: *Jan. 30, 2001

(54) METALLOCENE STABILIZED ALUMOXANE

(75) Inventors: Agapios Kyriacos Agapiou, Humble; Patrick Brant, Seabrook, both of TX (US)

(73) Assignee: Exxon Chemical Patents Inc., Houston, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/884,426

(22) Filed: Jun. 27, 1997

Related U.S. Application Data

(63) Continuation of application No. 08/513,376, filed on Aug. 10, 1995, now abandoned.

(51) Int. Cl.[7] .................................. C07F 5/06; C07F 7/00; C07F 17/00
(52) U.S. Cl. .......................... 556/171; 556/43; 556/175; 556/179; 556/182; 526/943; 526/160; 502/103; 502/117
(58) Field of Search ........................ 556/171, 43, 175, 556/179, 182; 502/103, 117; 526/160, 943

(56) References Cited

U.S. PATENT DOCUMENTS

| | | | |
|---|---|---|---|
| 4,665,047 | 5/1987 | Slaugh | 502/108 |
| 5,240,894 | 8/1993 | Burkhardt | 502/108 |
| 5,308,817 | 5/1994 | Reddy et al. | 502/117 |
| 5,371,260 | 12/1994 | Sangokoya | 556/171 |
| 5,393,851 * | 2/1995 | Ewen et al. | 526/153 |
| 5,412,131 | 5/1995 | Sangokoya | 556/175 |
| 5,416,229 | 5/1995 | Tran | 556/179 |

FOREIGN PATENT DOCUMENTS

| | | |
|---|---|---|
| 0645393A1 | 3/1995 | (EP) . |
| 7-002918 | 1/1995 | (JP) . |

* cited by examiner

*Primary Examiner*—Porfirio Nazario-Gonzalez
(74) *Attorney, Agent, or Firm*—C. Paige Schmidt; Anthony Chi; Charles E. Runyan

(57) ABSTRACT

Stabilized alumoxane solutions are provided as well as a method for producing such solutions. The method generally involves the use of metallocene catalyst component(s) that when mixed with alumoxane solutions reduce the tendency for such solutions to form gels.

13 Claims, No Drawings

METALLOCENE STABILIZED ALUMOXANE

This is a continuation of application Ser. No. 08/513,376, filed Aug. 10, 1995, now abandoned.

FIELD OF THE INVENTION

This invention relates to a method for producing stabilized alumoxane solutions that are resistant to gel formation. Specifically, the method relates to the use of metallocene catalyst components which, when combined with alumoxane solutions, have the effect of stabilizing such solutions by prolonging the time it takes to form gels.

BACKGROUND

Alumoxane is commonly used as an activator for metallocene catalyst components in the formation of metallocene catalyst systems. A well-known problem associated with alumoxane solutions is the formation of gel or gel-like particles in the solutions as they age. Typically the alumoxane solution will become more and more viscous until the solution completely gels. This typically occurs over a matter of weeks. More concentrated alumoxane solutions form gels more quickly.

The formation of gels in alumoxane solutions creates many serious problems. For example, it is difficult to transfer such solutions through a line. It is also difficult to effectively combine gelled alumoxane solutions with other substances and catalyst systems made with such solutions tend to have lower activity and have been shown to cause increased reactor fouling tendency when used in olefin polymerization.

Gel formation is believed to be associated with continued reaction leading to increased molecular weight of the oligomeric alumoxane structure. Many methods for reducing gel formation have been described. Refrigeration has been shown to reduce the rate of gel formation, however, refrigeration is quite costly. Vigorous shaking of a gelled alumoxane solution temporarily disperses the gels. Gels can partially be removed by decanting the solution. Unfortunately, these methods not only involve extra effort but are not entirely effective.

A number of methods for preparing gel-free or reduced gel alumoxane 5 solutions have been described. For example, U.S. Pat. No. 5,157,137 describes a method of making alumoxane wherein the alumoxane solution is treated with an anhydrous salt and/or hydroxide of an alkali or alkaline earth metal. It is reported that alumoxane solutions made in this way remain gel free for an extended period of time. U.S. Pat. No. 5,235,081 describes a method of removing gels from alumoxane by mixing an aromatic hydrocarbon solvent of the alumoxane with an aliphatic hydrocarbon solvent and then separating the precipitated solids from the alumoxane solution. U.S. Pat. No. 5,371,260 describes the use of primary or secondary amines with subsequent heat and filtration to prepare gel-free alumoxane solutions. U.S. Pat. No. 5,416,229 describes the use of certain electron-rich heteroatom compounds to stabilize alumoxane solutions and reduce gel formation. While these methods may be somewhat effective, it has been found that some catalyst systems made using such stabilized alumoxanes exhibit inferior performance.

The present inventors have found that by adding metallocene to an alumoxane solution, the alumoxane solution surprisingly remains gel free for an extended period of time. Such solutions may be successfully used to prepare catalyst systems that are highly active and that do not cause extensive fouling of the polymerization reactor when used to polymerize olefins.

SUMMARY

This invention relates to a method for stabilizing alumoxane, said method comprising the steps of: (a) combining a metallocene catalyst component with a solution of alumoxane thereby forming a stabilized alumoxane solution; and (b) aging the stabilized alumoxane solution for a time period of at least 24 hours. This invention further relates to a method for producing a catalyst system wherein the stabilized alumoxane produced by the method described above is combined with an additional amount metallocene and optionally a porous support material There is also provided a method for polymerizing olefins comprising contacting the catalyst system described above with olefin monomer(s) under conditions of polymerization.

DETAILED DESCRIPTION OF PREFERRED EMBODIMENTS

Generally, the method of the invention involves simply adding one or more metallocene catalyst component to a solution of alumoxane. The resulting stabilized solution may then be aged for a period of time without forming a substantial amount of gels. This period of time may extend up to 5 years or more. Preferably this period of time is greater than 24 hours, more preferably from 24 hours to 5 years, even more preferably from 2 days to 3 years, even more preferably from 1 to 12 months.

As used herein, "aging" simply means allowed to sit without being used as a catalyst system or component. During the aging process, a precipitate may form.

This precipitate may be dispersed by stirring or shaking or may be easily filtered from the solution.

Preferably the alumoxane solution to which the metallocene is added is fresh. As used herein the terms "fresh" and "freshly prepared" when referring to alumoxane means that the alumoxane is not more than four weeks old (i. e., not more than four weeks have passed from the time of preparation), preferably not more than two weeks old, more preferably not more than 1 week old, most preferably not more than 3 days old.

The stability of an alumoxane solution will depend to some extent on its concentration. The more concentrated the solution, the more quickly the solution will gel. Conversely, a less concentrated solution such as a 10 weight percent or less solution, will remain gel-free for a longer period of time.

The alumoxane solutions useful in the practice of this invention are preferably 5 to 50 weight percent alumoxane solutions, more preferably, the weight percent is in the range of from 10 to 30 weight percent methylalumoxane solutions. Methylalumoxane is the preferred alumoxane. These solutions may be prepared by methods well known in the art or conveniently obtained from commercial sources.

Alkylalumoxanes are thought to contain about 4 to 20 of the repeating units:

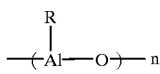

where R is a $C_1$–$C_8$ alkyl including mixed alkyls. Particularly preferred are the compounds where R is methyl. There are a variety of methods for preparing alumoxane, non-limiting examples of which are described in U.S. Pat. No.

4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180, all of which are fully incorporated herein by reference.

The amount of metallocene added to the alumoxane solution may vary widely but preferably the molar ratio of the aluminum of the alumoxane to the transition metal of the metallocene is preferably in the range of from about 1000:1 to about 10:1, preferably about 500:1 to about 25:1, even more preferably about 200:1 to about 50:1 and most preferably about 150:1 to about 50:1.

The metallocene may be added as a solution in an aromatic solvent such as toluene or as a solid at any temperature. Preferably the mixture is stirred thoroughly until all solids are dissolved.

Any metallocene may be used in the practice of the invention. Metallocenes are typically those bulky ligand transition metal compounds derivable from the formula:

$$[L]_mM[A]_n$$

where L is a bulky ligand; A is leaving group, M is a transition metal and m and n are such that the total ligand valency corresponds to the transition metal valency. Preferably the catalyst is four co-ordinate such that the compound is ionizable to a $1^+$ charge state.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or derived ligand.

Metallocene compounds generally contain a multiplicity of bonded atoms, preferably carbon atoms, and typically contain a cyclic structure such as, for example, a cyclopentadienyl ligand, substituted or unsubstituted, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, hydrogen or any other univalent anionic ligand. Non-limiting examples of metallocene components and catalyst systems are discussed in for example, U.S. Pat. Nos. 4,530,914, 4,952,716, 5,124,418, 4,808,561, 4,897,455, 5,278,119, 5,304,614 each of which is herein fully incorporated by reference. Also, the disclosures of EP-A-0129,368, EP-A-0520732, EP-A-0420436, WO 91/04257 WO 92/00333, WO 93/08221, and WO 93/08199 are each fully incorporated herein by reference.

The development of metallocene catalyst systems in the art for the polymerization of alpha olefins is illustrated in the disclosures of U.S. Pat. No. 4,871,705 to Hoel, U.S. Pat. No. 4,937,299 to Ewen, et al., 5,324,800 (U.S. application Ser. No. 07/752,415, filed Aug. 30, 1991) and EP-A-0 129 368 published Jul. 26, 1989, and U.S. Pat. Nos. 5,017,714 and 5,120,867 to Welborn, Jr. each of which is fully incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal.

The preferred transition metal component of the catalyst system of the invention are those of Group 4, particularly, zirconium, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity, see for example PCT publication WO 94/07927 incorporated herein by reference.

In one embodiment the metallocene catalyst component is represented by the general formula $(Cp)_mMeR_nR'p$ wherein at least one Cp is an unsubstituted or, preferably, a substituted cyclopentadienyl ring symmetrical or unsymetrically substituted; Me is a Group 4, 5 or 6 transition metal; R and R' are independently selected halogen, hydrocarbyl group, or hydrocarboxyl groups having 1–20 carbon atoms or combinations thereof; m=1–3, n=0–3, p=0–3, and the sum of m+n+p equals the oxidation state of Me.

In another embodiment the metallocene catalyst component is represented by the formulas:

$$(C_5R'_m)_pR''_s(C_5R'_m)MeQ_{3-p-x}$$

and $$R''_s(C_5R'_m)_2MeQ'$$

wherein Me is a Group 4, 5, 6 transition metal, at least one $C_5R'm$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a part of a substituted or unsubstituted ring or rings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring back to Me, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

Preferred metallocene catalyst components are those selected from the group consisting of bis(cyclopentadienyl) metal dihalides, bis(cyclopentadienyl) metal monoalkyl monohalides, bis(cyclopentadienyl) metal dihalides, bis(indenyl) metal dihalides, bis(indenyl) metal dialkyls and their ring-substituted analogs. Preferred metals are those selected from the group consisting of Ti, Zr, Cr and Hf. Preferred halides are those selected from the group consisting of Cl, Br, and F, with Cl being particularly preferred. Particularly preferred metallocenes are those selected from the group consisting of bis(cyclopentadienyl)zirconium dichloride, bis(n-butylcyclopentadienyl)zirconium dichloride, bis(n-butylcyclopentadienyl)zirconium dimethyl, bis(pentamethylcyclopentadienyl)zirconium dichloride, bis(pentamethylcyclopentadienyl)zirconium dimethyl, bis(pentamethylcyclopentadienyl)hafnium dichloride, bis(pentamethylcyclopentadienyl)zirconium dimethyl, bis(1-methyl-3-n-butylcyclopentadienyl) zirconium dichloride, bis(1-methyl-3-n-butylcyclopentadienyl)zirconium dimethyl, bis(1-methyl-3-n-butylcyclopentadienyl)hafnium dichloride, and bis(1-methyl-3-n-butylcyclopentadienyl)zirconium dimethyl.

After the stabilized alumoxane is aged, it may be used in at least one of two ways. First, the alumoxane may be used directly as an active catalyst system.

Second, additional metallocene may be added to the aged alumoxane before use as an active catalyst system. If additional metallocene catalyst component is added, preferably, the metallocene and aged alumoxane are combined first prior to charging to the polymerization reactor. It is also preferable to combine the metallocene(s) and aged alumoxane with a support material prior to charging to the reactor. The metallocene may be applied to the support before application of the aged alumoxane or, conversely, the aged alumoxane may be applied first to the support followed by the metallocene. Alternatively, and preferably, the metallocene and aged alumoxane are combined first then applied to the support material.

The mole ratio of the aluminum of the aged alumoxane component to the total of the metallocene component(s) is preferably in the range of ratios between 0.3:1 to 1000:1, preferably 20:1 to 800:1, and most preferably 50:1 to 500:1.

Examples of supporting the catalyst system used in the invention are described in U.S. Pat. Nos. 4,937,217, 4,912,075, 4,935,397, 4,937,301, 4,914,253, 5,008,228, 5,086,025, 5,147,949, 4,808,561, 4,897,455, 4,701,432, 5,238,892, 5,240,894, 5,332,706 and U.S. patent application Ser. Nos. 138,818, filed Oct. 14, 1993, 170,108, filed Dec. 20, 1993, 182,244, filed Jan. 14, 1994, 233,668, filed Apr. 26, 1994, 265,533, filed Jun. 24, 1994, 265,532, filed Jun. 24, 1994, 271,598, filed Jul. 7, 1994, 287,327, filed Aug. 8, 1994, 285,380, filed Aug. 3, 1994 and PCT Publication WO 93/11172, all of which are herein incorporated by reference.

The catalyst system of this invention is suited for the polymerization of monomers, optionally with at least one comonomer in any polymerization or prepolymerization process, gas, slurry or solution phase or a high pressure autoclave process. In the preferred embodiment a gas phase or slurry phase process is utilized.

Typically in a gas phase polymerization process a continuous cycle is employed wherein one part of the cycle of a reactor, a cycling gas stream, otherwise known as a recycle stream or fluidizing medium, is heated in the reactor by the heat of polymerization. The recycle stream usually contains one or more monomers continuously cycled through a fluidized bed in the presence of a catalyst under reactive conditions. This heat is removed in another part of the process by a cooling system external to the reactor. The recycle stream is withdrawn from the fluidized bed, cooled, and recycled back into the reactor. Simultaneously, polymer product is withdrawn from the reactor and new or fresh monomer and catalyst is added to replace the polymerized monomer and consumed catalyst. See for example U.S. Pat. Nos. 4,543,399, 4,588,790, 5,028,670, 5,382,638 and 5,352,749, 5,405,922, U.S. application Ser. No. 081306,055 filed Sep. 14, 1994 and U.S. application Ser. No. 08/317,136, filed Oct. 3, 1994 and PCT patent application WO 94/28032 published Dec. 8, 1994 all of which are fully incorporated herein by reference.

In one embodiment, the invention is directed toward a polymerization process involving the polymerization of one or more of the monomer(s) including ethylene alone or in combination with one or more linear or branched monomer(s) having from 3 to 20 carbon atoms, preferably 3 to 12 carbon atoms. The process is particularly well suited for copolymerization reactions involving the polymerization of ethylene in combination with one or more monomers such as propylene, butene-1, pentene-1,4-methylpentene-1, hexene-1, octene-1, decene-1, styrene and cyclic and polycyclic olefins such as cyclopentene, norbornene and cyclohexene or a combination thereof. Other monomers for use with ethylene may include polar vinyl monomers, diolefins such as 1,4-pentadiene, 1,4-hexadiene, 1,5-hexadiene, norbornene, norbornadiene, and other unsaturated monomers including acetylene, 1-alkynes and aldehyde monomers. Higher alpha-olefins and polyenes or macromers may be used also. Preferably the comonomer is an alpha-olefin having from 3 to 15 carbon atoms, preferably 4 to 12 carbon atoms and most preferably 4 to 10 carbon atoms.

In another embodiment ethylene is polymerized with at least two different comonomers to form a terpolymer and the like, the preferred comonomers are a combination of alpha-olefin monomers having 3 to 10 carbon atoms, more preferably 3 to 8 carbon atoms, optionally with at least one diene monomer. The preferred terpolymers include the combinations such as ethylene/butene-1/hexene-1, ethylene/propylenelbutene-1, ethylene/propylene/hexene-1, ethylene/propylene/norbornadiene, ethylene/propylene/1,4-hexadiene and the like.

In one embodiment a scavenger may be used, however, in another preferred embodiment, the process of the invention does not require a scavenger, non-limiting examples of scavenger compounds include for example, triethylaluminum (TEAL), trimethylaluminum (TMAL), triisobutylaluminum (TIBAL), tri-n-hexylaluminum (TNHAL), diethyl aluminum chloride (DEAC) and the like.

In another embodiment of the process of the invention an inert hydrocarbon component or antistatic agent as described in U.S. Pat. No. 5,238,278 and U.S. application Ser. No. 08/322,675, filed Oct. 13, 1994 can be introduced into the reactor together, separately or apart, from the catalyst system of the invention.

A slurry polymerization process generally involves pressures in the range of about 1 to about 500 atmospheres or even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, isobutylene, ethylbenzene or xylene. The medium employed should be liquid under the conditions of polymerization and relatively inert. Preferably, hexane or isobutane is employed. A non-limiting example of a slurry process can be found in PCT Publication WO 94/21691, published Sep. 29, 1994 which is herein fully incorporated by reference.

EXAMPLES

In order to provide a better understanding of the present invention including representative advantages thereof, the following examples are offered.

Effect of Gel Formation on Catalyst Performance

Example 1

16 cc of toluene was added to 5g of silica (Davison 948, 70 $\mu$ average particle size, sieved to remove the fraction greater than 75 $\lambda$, calcined at 600° C. under a nitrogen atmosphere. While stirring, 6.64 cc of a 30 wt. % solution of methylalumoxane (MAO) (Albemarle Corp.) was added to the silica and the mixture was stirred for one hour. The MAO had been aged for six months and it was gelatinous in nature. It was therefore necessary to vigorously shake and stir the MAO solution to transfer it to the silica. Metallocene (1-methyl-3-n-butyl cyclopentadienyl)$_2$ZrCl$_2$ (0.144 g in 2 cc of toluene) was added to the silica/MAO slurry and mixed for an additional hour. The mixture was then dried at 75° with a nitrogen purge and evaluated in an isobutane slurry batch polymerization reactor under the following conditions.

In a clean nitrogen purged 1.2 liter autoclave 800 cc of dry and oxygen-free isobutane was added followed by the addition of 0.3 cc. of a 1.25 molar solution of TEAL in hexane. While stirring, 60 cc of 1-hexene was added and the mixture was heated to 85° C. 100 mg of the catalyst system prepared above was added to the reactor via an ethylene injector port and the total pressure was adjusted and maintained at 325 psi (22.1 atm.) on demand. Polymerization was allowed to proceed for 40 minutes and was monitored by the ethylene uptake curve. Polymerization was terminated by interrupting the heat and quickly venting the contents of the reactor. The polymer was recovered and dried overnight in a vacuum oven and then weighed.

Example 2

The catalyst system was prepared as in Example 1 except that the silica used was Davison 50 μ average particle size. The polymerization conditions were as in Example 1.

Example 3

The catalyst system was prepared as in Example 1 except the MAO used was fresh, clear and non-gelatinous in nature. The polymerization conditions were as in Example 1.

Example 4

The catalyst system was prepared as in Example 2 except the MAO used was fresh and was clear and non-gelatinous in nature. The polymerization conditions were as in Example 1.

The results of the polymerizations are reported in Table 1 below. Fouling index is measured on a scale from 0–6 with 6 being the highest amount of fouling. A fouling index of 0 indicates that the reactor was completely clean with no evidence of polymer build-up. A fouling index of 6 indicates that the reactor was fouled to the extent that polymer sheets covered the walls and agitator.

TABLE 1

| Example # | Silica APS (μ) | MAO | Yield (g) | Activity (g/g/cat · h) | Fouling Index[2] |
|---|---|---|---|---|---|
| 1 | 30–75[1] | 6 mo. old | 116 | 1740 | 4.0 |
| 2 | 50 | 6. mo. old | 110 | 1650 | 6.0 |
| 3 | 30–75[1] | fresh | 137 | 2055 | 1.5 |
| 4 | 50 | fresh | 142 | 2115 | 1.5 |

[1]Davison 948 (70μ) silica sieved to remove fraction > 75μ.
[2]Scale of 0–6, 6 indicating the highest amount of fouling in the reactor.

These results show that gel-containing MAO leads to low catalyst activity and increased fouling.

Comparative Example 5

A 30 wt. % MAO solution in toluene (Ablemarle Corp.— about 1 week old) was observed over a period of 6 months and the results are summarized below in Table 2.

Example 6

67.5 cc of a clear, freshly prepared 30 wt. % MAO (Albemarle Corp.) solution in toluene was stirred in 92.5 cc of toluene. To this was added 1.45 g of bis(1,3 methyl n-butylcyclopentadienyl)zirconium dichloride in 15 cc of toluene. This solution was stirred for 30 minutes. The resulting metallocene solution contained 20 wt. % bis(1-methyl-3-n-butylcyclopentadienyl)zirconium dichloride. The final MAO/metallocene solution was observed over a period of 12 months and the results are summarized below in Table 2.

TABLE 2

| Example # | Initial Appearance | Aging Time | Final Appearance |
|---|---|---|---|
| 5 | colorless/clear | 7 days | white precipitate easily dispersed |
|  |  | 1 month | 30 vol % gel |
|  |  | 3 months | 60 vol % gel |
|  |  | 6 months | 75–100 vol % gel |
| 6 | brownish/yellow-clear | 7 days | brownish/yellow-clear |
|  | clear | 1 month | brownish/yellow-clear |
|  |  | 12 months | precipitate easily dispersed |

Example 7

MAO was combined with bis(1-methyl-3-n-butylcyclopentadienyl)zirconium dichloride as described in Example 6. This MAO solution was allowed to age for 1 month. To 17.5 cc of this MAO was added 5 g of silica (Davison, dehydrated at 600° C.). 2.5cc of toluene was added to the mixture with vigorous stirring followed by the addition of 0.036 g of the antistatic agent AS-990 RN(CH$_2$CH$_2$OH)$_2$ dissolved in 2 cc of toluene. The catalyst system was residue dried at 75° C. with a nitrogen purge until it was free flowing. The catalyst system was then used in polymerization as described in Example 1. The results are reported in Table 3.

Example 8

A catalyst system was prepared as in example 7 except that the MAO solution was allowed to age for 2 months. Polymerization conditions were as described in Example 1. The results are reported in Table 3.

TABLE 3

| Example | Aging Time | Yield (g) | Activity (g/g/cat · hr) | Fouling Index[1] |
|---|---|---|---|---|
| control | none | 135 | 2025 | 0.5 |
| 7 | 1 month | 128 | 1920 | 0.5 |
| 8 | 2 months | 138 | 2070 | 0.5 |

[1]Scale of 0–6, 6 indicating the highest amount of fouling in the reactor.

The above results indicate that metallocene stabilized MAO may be aged up to two months without a compromise in catalyst activity and without any increase in fouling tendency.

While the present invention has been described and illustrated by reference to preferred embodiments, it will be appreciated by those of ordinary skill in the art that the invention lends itself to variations not necessarily illustrated herein.

We claim:

1. A method for stabilizing alumoxane, said method comprising the steps of:
    (a) combining a metallocene catalyst component with a solution of alumoxane wherein the mole ratio of the aluminum of the alumoxane to the transition metal of the metallocene is in the range of from about 200:1 to about 85:1 thereby forming a stabilized alumoxane solution; and
    (b) aging the stabilized alumoxane solution for a time period of at least 24 hours.

2. The method of claim 1 wherein the time period is at least two months.

3. The method of claim 1 wherein the time period is at least three months.

4. The method of claim 1 wherein the mole ratio of the aluminum of the alumoxane to the transition metal of the metallocene is in the range of from about 150:1 to about 85:1 and wherein the time period is in the range of from four months to six months.

5. The method of claim 1 wherein the alumoxane in methylalumoxane.

6. The method of claim 1 wherein the metallocene is selected from the group consisting of bis(cyclopentadienyl) zirconium dichloride, bis(n-butylcyclopentadienyl) zirconium dichloride, bis(n-butylcyclopentadienyl) zirconium dimethyl, bis(pentamethylcyclopentadienyl) zirconium dichloride, bis(pentamethylcyclopentadienyl) zirconium dimethyl, bis(pentamethylcyclopentadienyl) hafnium dichloride, bis(pentamethylcyclopentadienyl) zirconium dimethyl, bis(1-methyl-3-n-butylcyclopentadienyl)zirconium dichloride, bis(1-methyl-3-n-butylcyclopentadienyl)zirconium dimethyl, bis(1-methyl-3-n-butylcyclopentadienyl)hafnium dichloride, and bis(1-methyl-3-n-butylcyclopentadienyl)zirconium dimethyl.

7. The method of claim 1 wherein the alumoxane is fresh.

8. The method of claim 1 wherein the alumoxane is not more than one week old.

9. Stabilized alumoxane prepared by the method of claim 1.

10. The method of claim 1 wherein the mole ratio of the aluminum of the alumoxane to the transition metal of the metallocene is in the range of from about 150:1 to about 85:1.

11. The method of claim 1 wherein the time period is at least 2 days.

12. The method of claim 1 wherein the time period is at least 7 days.

13. The method of claim 1 wherein the time period is at least one month.

* * * * *

UNITED STATES PATENT AND TRADEMARK OFFICE
CERTIFICATE OF CORRECTION

PATENT NO. : 6,180,808 B1　　　　　　　　　　　　　　　　　　　　Page 1 of 1
DATED : January 30, 2001
INVENTOR(S) : Agapios Kyriacos Agapiou, Patrick Brant It is certified that error appears in the above-identified patent and that said Letters Patent is hereby corrected as shown below:

Column 6,
Line 67, please replace "75 λ" with -- 75 $\mu$ --.

Column 8,
Line 8, please replace "20 wt %" with -- 0.92 wt. % --.

Signed and Sealed this

Fifth Day of February, 2002

Attest:

JAMES E. ROGAN
*Attesting Officer*　　　*Director of the United States Patent and Trademark Office*